(12) United States Patent
Olsson

(10) Patent No.: US 6,821,471 B2
(45) Date of Patent: Nov. 23, 2004

(54) METHOD FOR THE MANUFACTURING OF A PLATE

(75) Inventor: Håkan Olsson, Karlskoga (SE)

(73) Assignee: Morphic Technologies Aktiebolag, Karlskoga (SE)

(*) Notice: Subject to any disclaimer, the term of this patent is extended or adjusted under 35 U.S.C. 154(b) by 244 days.

(21) Appl. No.: 09/890,890

(22) PCT Filed: Apr. 26, 2001

(86) PCT No.: PCT/SE01/00894

§ 371 (c)(1),
(2), (4) Date: Jan. 25, 2002

(87) PCT Pub. No.: WO01/83132

PCT Pub. Date: Nov. 8, 2001

(65) Prior Publication Data

US 2002/0135095 A1 Sep. 26, 2002

(30) Foreign Application Priority Data

Apr. 28, 2000 (SE) .............................. 0001559
Dec. 11, 2000 (SE) .............................. 0004554
Jan. 12, 2001 (SE) .............................. 0100106

(51) Int. Cl.$^7$ .............................................. B22F 3/03
(52) U.S. Cl. ..................... 264/293; 72/379.2; 419/66
(58) Field of Search ................. 264/603, 667, 264/293; 72/379.2; 419/66

(56) References Cited

U.S. PATENT DOCUMENTS

| 4,787,837 A | * | 11/1988 | Bell ............................ 425/385 |
| 5,128,083 A | * | 7/1992 | Brookes ...................... 264/162 |
| 5,729,883 A | | 3/1998 | Yoshioka et al. ........... 29/527.5 |

FOREIGN PATENT DOCUMENTS

| DE | 19755028 | 6/1999 | ............ B21K/1/76 |
| GB | 2 077 634 A | 12/1981 | ............ H01M/4/22 |
| SU | 1 579 620 | 7/1990 | .............. B21J/5/12 |

OTHER PUBLICATIONS

Copy of the International Search Report for PCT/SE01/00894.

WPI/Derwent's Abstract, No. 1991–162645, week 199122, Abstract of SU, 1579620 A (Kalinovskii I P). Jul. 23, 1990.

* cited by examiner

Primary Examiner—Peter Chin
Assistant Examiner—Carlos Lopez
(74) Attorney, Agent, or Firm—Michael D. Bednarek; Shaw Pittman LLP

(57) ABSTRACT

A method for the manufacturing of a plate (2) of metal or of a ceramic material, the plate having one or more fields (3) which occupy the major part of the surface of the plate and which on at least one side of the plate is high relief patterned such that the plate on said at least one side within the area of said field or fields has reliefs with high projections and deep valleys (9) or recesses (8) alternatingly, and between the sides a thin web (10), said high relief patterned field or fields being at least partly bordered by broad edge portions (4) which have a thickness larger than the mean thickness of the plate within the region of said high relief patterned field or fields. In a preparatory step, an intermediate product (1) is manufactured. This intermediate product includes at least a first portion (11) which shall form said high relief patterned field(s), which however is/are not yet high relief patterned but contain(s) an adequate quantity of material. This intermediate product is then placed between two engraved moulding tool parts (30, 31), which are stricken against one another therein that an impact member with sufficiently high kinetic energy is stricken against at least one of the moulding tool parts for the material to flow out and fill the mould cavity between the tool parts.

19 Claims, 5 Drawing Sheets

METHOD FOR THE MANUFACTURING OF A PLATE

TECHNICAL FIELD

The invention concerns a method for the manufacturing of a plate of metal or of a ceramic material, the plate comprising one or more fields which occupy the major part of the surface of the plate and which on at least one side of the plate is high relief patterned, more specifically patterned such that the plate on said at least one side within the area of said field or fields has reliefs with high projections and deep valleys or recesses alternatingly, and between the sides a thin web, said high relief patterned field or fields being at least partly bordered by broad edge portions which have a thickness larger than the mean thickness of the plate within the region of said high relief patterned field or fields. Plates intended to be included in fuel cells or in heat exchangers are typical examples of plates of the above kind.

BACKGROUND OF THE INVENTION

It is difficult to manufacture metal plates of the above described kind, and it is extremely difficult to manufacture such plates which are thin and pronouncedly high relief patterned, at the same time as they are broad. Conventional methods, such as mechanical machining, spark machining, etching, laser working, etc. are slow and expensive and yet it is difficult to provide a perfect product with such conventional methods. This, to a high degree has impeded the development of fuel cells in which numerous high relief patterned plates are included. Such plates in a system can contribute e.g. to separate different gases, transport rest products, and conduct generated current in the fuel cell system and usually have a circular, square or rectangular shape with a central field, which on both sides have grooves, which are separated from one another by relatively high tongues. These high relief patterned fields are surrounded by a circumferential, comparatively broad edge, which forms a flat frame around the high relief patterned central field, the top planes of the tongues coinciding with the two side planes of the frame. The thickness of such plates may vary quite considerably from case to case but does not normally exceed 3 mm, while the thickness of the web between the grooves may amount e.g. in the order of 1 mm. A method of producing the grooves in the plates according to today's technique is by any kind of machining but that is as mentioned a slow and expensive process. It is not possible to cause the material to flow out completely in the tool mould through conventional moulding technique, because considerable friction forces prevent the transportation of material. If, on the other hand, higher pressures were applied in conventional equipment for the provision of necessary transportation of material in order to cause the material to completely fill the tool mould, the tools may be damaged. Similar problems exist in the manufacturing of plates intended to be included in heat exchangers.

DISCLOSURE OF THE INVENTION

It is the purpose of the invention to provide a considerably more convenient process for the manufacturing of metal plates of the type mentioned in the preamble, particularly metal plates for fuel cells and/or for heat exchangers. More particularly the invention aims at providing a manufacturing technique which is considerably cheaper than conventional technique but which nevertheless provides a product which satisfies the very rigorous demands in terms of dimensional accuracy, density and other features which are raised about fuel cell plates and heat exchanger plates. The method of the invention, however, is not restricted only to manufacturing of fuel cell plates and heat exchanger plates but can also be widely used for other metal plates, in particular plates which are broad in relation to their thickness.

According to the invention a moulding technique is used, employing high kinetic energy for the manufacturing of the plate with the high relief patterned sides. But it is not possible to manufacture plates with that pattern by high kinetic energy forming by a single stroke when starting from powder or from a flat plate. Even if the material is softened by the very high pressure that is generated at the high kinetic forming, the ability of the material will nevertheless be too restricted to flow not only in the labyrinth-like passages in that part of the moulding tool that shall form the high relief pattern, but also to flow out to the thicker edge portions. Nor is it possible in the same tool to form the product through a series of strokes. To the contrary, the problems would be accentuated. This is particularly true when starting from a powder, which certainly can be plasticised in a surface layer at the first impact. But that would instead make the plasticising of the powder further down in the powder bed more difficult, resulting in a very inhomogeneous compacting and increased friction.

The principle of the invention therefore is to first manufacture an intermediate product suitable for a final forming operation based on forming the high relief patterned plate in a single stroke through the supply of very high kinetic energy.

According to the invention an intermediate product is manufactured in at least one preliminary step, the intermediate product comprising a first portion which shall form said high relief patterned field(s), which however is(are) not yet high relief patterned but contain(s) a quantity of material essentially corresponding to the quantity of material existing within said field(s) of the finished plate, and second portions which shall form said edge portions and which contain substantially the quantity of material that shall exist in the edge portions of the finished plate. This intermediate product is placed between at least two engraved moulding tool parts, which are movable relative to one another, at least one of said moulding tool parts being high relief embossed and at least one being a punch, said tool parts, when they are maximally brought together, forming between them and/or together with at least one or more tool parts, a mould cavity corresponding to the final shape of the finished plate within the regions of said high relief patterned field(s) and at least near the final shape of said edge portions. Then the high relief pattern within the region/regions of said field(s) is/are established by striking the engraved tool parts against one another, at least said punch being stricken against said intermediate product wherein the material within the regions of said at least one first portion is caused to flow and fill the mould cavity to establish said high relief pattern essentially without transportation of material between said first and second portions.

In order to strike the engraved tool parts against one another one or two, respectively, rams can be used which preferably are hydraulically powered, which are stricken against the punch, or the punches, respectively, which in turn transmit(s) the kinetic energy to the intermediate product. The punches and impact members in this case thus are separate units, wherein the impact members can consist of e.g. hydraulic impact pistons. It is however possible, that the impact members and the punches are integrated units. This may particularly be true when the stroke is performed from above, wherein the impact member, e.g. a hydraulic piston, is united with the punch which from above is stricken down into a die. The punch in this case is an elongation of the piston rod of the impact piston. The same condition in principle can also be conceived in the case when the impact machine comprises also a lower punch which e.g. via a lower punch holder may be united with a lower impact member, which also may consist of a piston. According to this modification, the acceleration of the punches during the strike preferably takes place within the through-hole in said at least one further tool part, which preferably is a die, containing the cavity in which the moulding work takes place.

By employing a very high impact action in the final forming operation through a single, very powerful strike on the working material from one direction, or from two opposite directions, a pressure is generated which has a very short duration but is so high that the working material is plasticised and fills the mould cavity, so that the material will flow out to all parts of the mould cavity considerably more efficiently, probably because of lower friction, than in a conventional press operation, which is based on the employment of very high forces. The technique which implies forming with high, or more correctly, adequate kinetic energy of movable tool parts, causes the material to plasticise, and therein possibly also causes the lower friction to arise, Which allows the material to be formed plastically at a rate which may be 10–100 times higher than/according to conventional forming technique.

According to performed measurements and calculations, the pressure pulse generated at said single impact has a duration which is less than 0.001 sec. but a magnitude which lies in the range 1–10 GPa. Typically the range is 1.5–5 GPa. Because of the high pressure and the plasticising caused by the high pressure, probably the low friction between the working material and the walls of the mould cavity is also obtained, as well as between the powder grains when the working material consists of a powder (can be applied at the manufacturing of the intermediate product), which contributes to or is a prerequisite for the ability of the working material to flow out and fill all parts of the mould cavity.

The starting material for the manufacturing of the intermediate product is either a ceramic powder or a metal powder or a homogenous ceramic or metal plate, which can be manufactured in a conventional way, e.g. by punching out of a larger plate, or by compacting and sintering a powder, or in any other way involving powder technique for the achievement of a homogenous plate with even thickness. At least when starting from a homogenous plate, the manufacturing of the intermediate product may aim at pressing out material to the outer edges of the plate. Whatever technique that is used, the objective of manufacturing the intermediate product is to provide an intermediate product in which a proper quantity of material exists at the right place, i.e. in the region of said field(s) and said edge portions, respectively, when performing the final forming operation, when the plate is formed between the engraved moulding tool parts under a very high pressure of very short duration as above described, so that the plate obtains said high relief pattern within the region of the centre field, i.e. is formed with grooves and tongues when it concerns manufacturing fuel cell plates. At the final forming operation, when the material is caused to flow because of plasticising under very high pressure, the porosity which possibly exists in the intermediate product when starting from a powder, can also be eliminated, so that a density is achieved, sufficient for the function of the plate, e.g. in a fuel cell. As an alternative the porosity can be eliminated by sintering the final formed plate in a subsequent operation. According to still another alternative the porosity is eliminated already in the intermediate product by sintering the intermediate product, i.e. heating it to an adequate temperature for fusing existing pores in the material before the plate is subjected to final forming. Also a combination of these alternatives can be conceived.

In connection with the manufacturing of the intermediate product, a green body can be manufactured powder metallurgically, which body, as above mentioned, suitably is sintered by heating, so that the powder grains coalesce to form an essentially consolidated body suited for the subsequent final forming by bringing engraved tool parts against one another with such high kinetic energy that the material will plasticise according to above. It is also conceivable to manufacture the intermediate product by pressing powder in a tool, which comprises at least one punch which is stricken with high kinetic energy against the powder, wherein the kinetic energy of the punch is so high and to such a high degree is transferred to the powder that the powder will plasticise to such a high degree that the intermediate product will be sufficiently consolidated to be used as an intermediate product for the final forming operation. It is also conceivable to form a green body or consolidated body by pressing in a plurality of steps.

In order to facilitate the pre-compacting of the powder to a well united or consolidated body in connection with the manufacturing of the intermediate product when starting from a metal powder, it might be advantageous to preheat the powder to at least 70° C. before the press operation or press operations, respectively. This particularly applies when said metal consists of a light metal, preferably any of the metals belonging to the group consisting of aluminium, magnesium, and titanium, or of an alloy which substantially consists of one or more of said metals. Typically, fuel cell plates are made of such metal. For the manufacturing of plates of other metals, such as brass or steel, including stainless steel, the stating material, whether it is a powder or a homogenous plate, should be preheated to a higher temperature.

The intermediate product can also be manufactured from a homogenous metal plate by conventional machining, such as for example milling or grinding in order to establish said first portion or portions having a smaller thickness than the edge portions, i.e. ensure "right quantity of metal on the right place" for the subsequent final forming by means of high kinetic energy, when the high relief pattern is established.

In connection with the forming operation or operations which include movements of tool parts with sufficiently high kinetic energy relative to one another, lower tool parts can be provided on an anvil which is stationary or movable upwards during the forming operation, while upper tool parts, which are accelerated to obtain a sufficiently high kinetic energy are stricken downwards against the lower tool part or tool parts, wherein devices preferably are provided to dampen or to eliminate the shock wave which otherwise is developed in the impact machine that is used. For example any of those impact machines which are described in the Swedish patent applications 0001558-6, 00016602, 0002030-5 and/or 0003279-7 filed by the same applicant, may be used, the disclosures of which herein being incorporated in the present text by reference. These machines are particularly well suitable for the final forming of fuel cell plates and heat exchanger plates, comprising so called high kinetic energy shaping, but can advantageously also be used for the manufacturing of the intermediate product also in the case also that manufacturing comprises forming of the type employing supply of adequate kinetic energy for the establishment of a pressure pulse having a very short duration but a very high magnitude.

One can also conceive that the engraving of the sides of the metal plate is carried out by means of separate tool parts in connection with the forming of the intermediate product from powder as well as in connection with the final forming of the high relief patterned plates. For example a central punch and a first ram, which possibly may be integrated, can be used for the central field or fields which shall be high relief patterned, and one or more circumferential punches and one or more second rams, which may also possibly be integrated, and/or may be used to form the circumferential, frame shaped edge portion. This principle gives an opportunity to supply most kinetic energy to the region where the requirements as far as good flowability are highest, i.e. the central field or fields which shall be high relief patterned.

In impact machines a technique is employed which often is referred to as high velocity forming, because high velocities of the rams in impact machines generally have been considered to be a requirement for the achievement of desired results as far as the forming work is concerned. High velocities of the moving units, however, can involve a complication, if the machine works according to the counter striking principle, i.e. with units which move towards one another during the impact operation. The complication lies in the fact that the movements of the units which are movable against one another must be synchronized and coordinated with great accuracy in terms of velocity (impulse) and position in order that the stroke shall be performed simultaneously with correct impulse of the masses which move against one another, something which becomes increasingly difficult the higher the velocities of the moving parts are.

An aspect of the invention is based on the consideration that the velocities of the movable units in the impact machines, which move against one another during the impact operation, need not at all be as large as has been considered necessary in view of prior art. Nor should the kinetic energies need to be correspondingly high, i.e. lower velocity shall not necessarily need to be compensated by correspondingly larger movable masses. With the same masses, according to this aspect of the invention, the velocity thus can be reduced in the order of 5 to 10 meters per sec. of said rams to the order of 1 meter per sec., or more generally 0.5–2 meters per sec.

The lower velocities thus improve the possibility of synchronizing the movements of the movable units during the impact operation. Even though the velocities are radically reduced, the forming work nevertheless can be perfect, whether the working material is a powder or a solid body. Without binding the invention to any specific theory, it can be assumed that this is due to the good synchronization of the counter directed movements, which in turn has the result that the kinetic energy of the moveable masses essentially can be used as effective forming work with small losses of energy to the machine foundation and stand.

Another favourable effect with the lower velocities of the units that are movable towards one another, is that the ram travels can be shortened. This makes it possible to design the impact devices/the rams and the punches to form integrated units, as above mentioned. The punches in this case may be inserted into the upper and lower openings, respectively, of the die in the starting position for an impact operation, even if the punches are integrated with the impact devices/rams or corresponding, wherein the ram travels, i.e. the acceleration lengths, will be shorter than the axial length of the mould cavity of the die.

It shall thus be understood that the expressions high kinetic energy or very high kinetic energy are relative conceptions and shall be interpreted to mean adequate kinetic energy for the achievement of the effect in terms of forming work, which has been mentioned in the foregoing and which will be described more in detail in the following, detailed description of the invention.

Further characteristic features and aspects of the invention as well as advantages will be apparent from the appending patent claims and from the following description of an embodiment.

BRIEF DESCRIPTION OF THE DRAWINGS

In the following description of an embodiment of an invention, reference will be made to the accompanying drawings, which schematically illustrate the manufacturing of a fuel cell plate, wherein FIG. 1 schematically shows the tool parts for the manufacturing of an intermediate product.

DESCRIPTION OF PREFERRED EMBODIMENT

Figure 5:
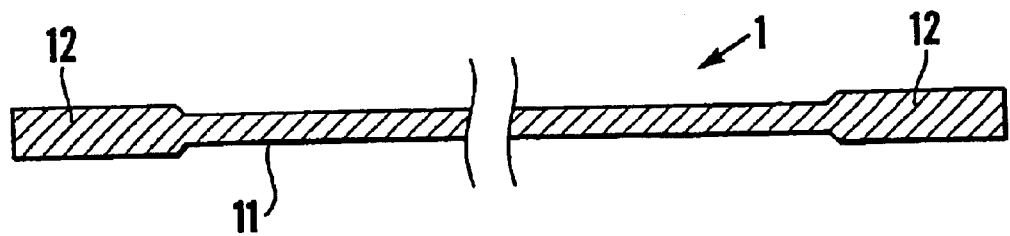
FIG. 5 shows the principle shape of the intermediate product in a cross section.
Figure 6:
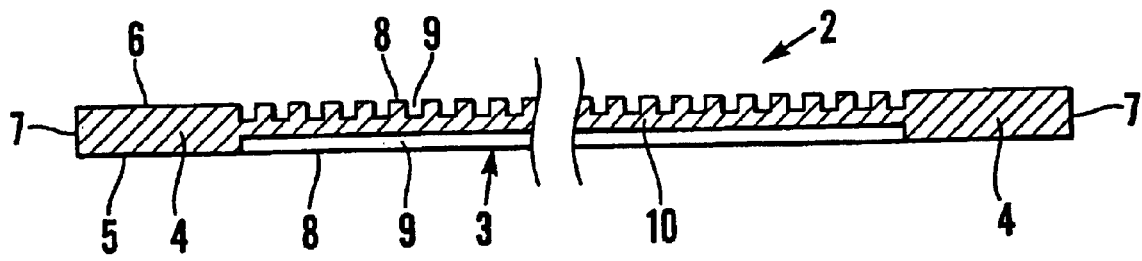
FIG. 6 shows the principle shape of the final product, a metal plate for fuels cells, in cross section.

With reference first to FIGS. 5 and 6, an intermediate product is designated 1, and schematically shown in cross section, a metal plate for fuel cells is designated 2. The plate 2, which is substantially square, consists of a central field 3, which occupies the major part of the surface of the plate, and edge portions 4, which are broad in comparison with the thickness of the plate and surrounds the whole field 3 as a frame. The edge portions 4 have flat broad surfaces 5, 6. The outer sides are designated 7. The centre field 3 according the embodiment is high relief patterned on both sides (also single sided high relief patterning can be conceived in some cases) and displays alternatingly tongues 8 and grooves 9. The tongues and grooves 8, 9 on the upper side according to the embodiment are at a right angle or at the nearest right angle to the tongues and grooves on the bottom side. Between the grooves 9, i.e. between the two sides of the plate, there is a thin web 10. The tops of the tongues 8 according to the embodiment are level with the broad surfaces 5, 6 of the edge portions.

The intermediate product 1 consists of a central, first portion 11, which in the finished product shall form the high relief patterned field 3, and around said first portion 11 circumferential portions 12, which shall form said circumferential portions or frame 4 of the finished plate 2.

The objective of the manufacturing of the intermediate product 1 is to shape a consolidated and essentially homogeneous intermediate product, the central portion 11 of which contains the metal quantity that shall form the high relief patterned central field 3 of the finished product 2. Possibly a very small surplus of metal can be tolerated in the central portion 1, which according to the embodiment is completely flat. Also the side portions 12 of the intermediate product 1 shall contain the metal quantity that shall be present in the outer portions 4 of the finished product 2. A certain surplus of metal in the portions 12 can be tolerated, if the final shaping of the product 2 is performed in such a way that the surplus can be caused to flow out to form "burr" 5 or corresponding, which can be removed in a skegging operation after completed compression moulding.

Figure 1:
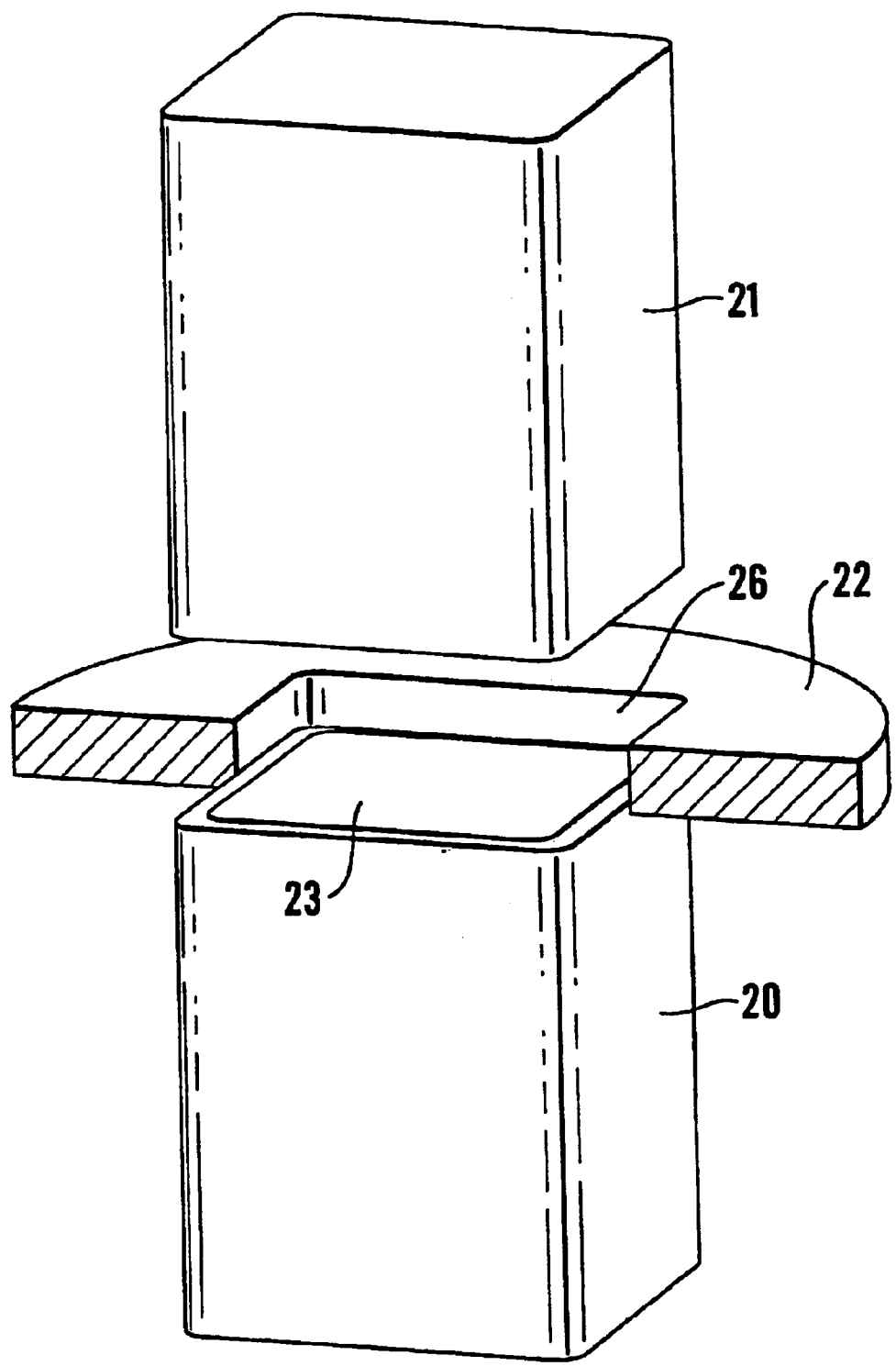
Figure 2:
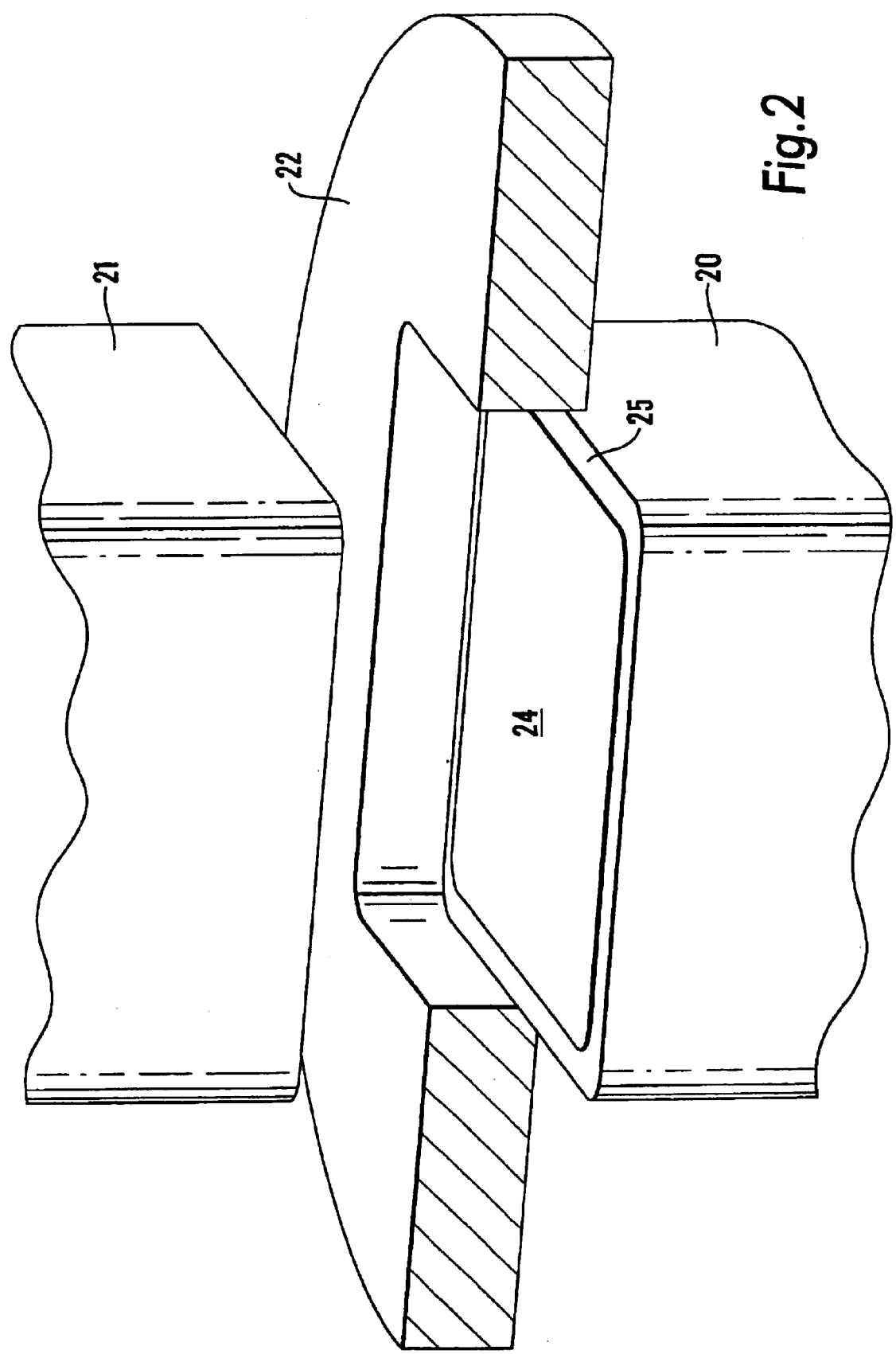
FIG. 2 shows a portion of FIG. 1 at a larger scale.
Figure 3:
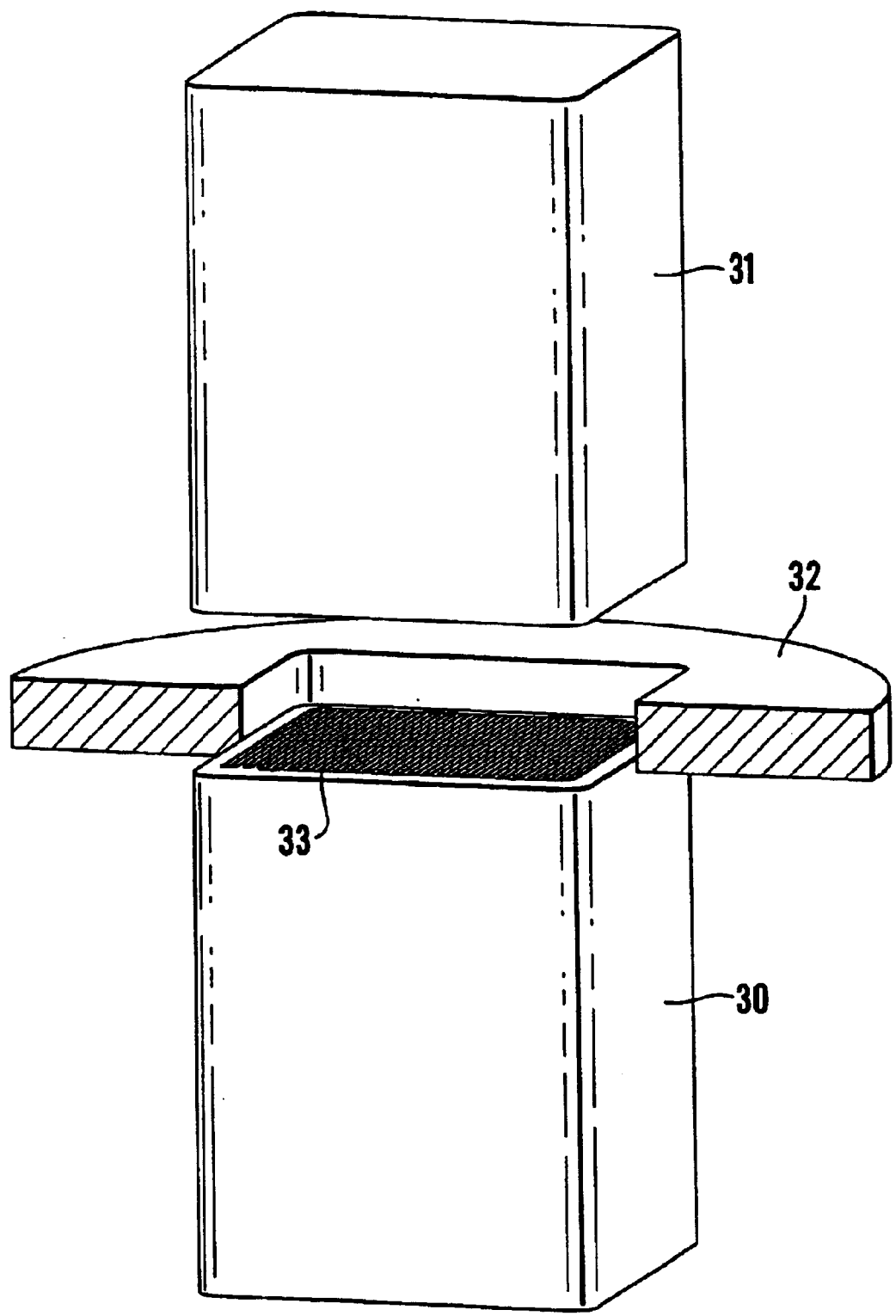
FIG. 3 shows the tool parts for the manufacturing of the final product.
Figure 4:
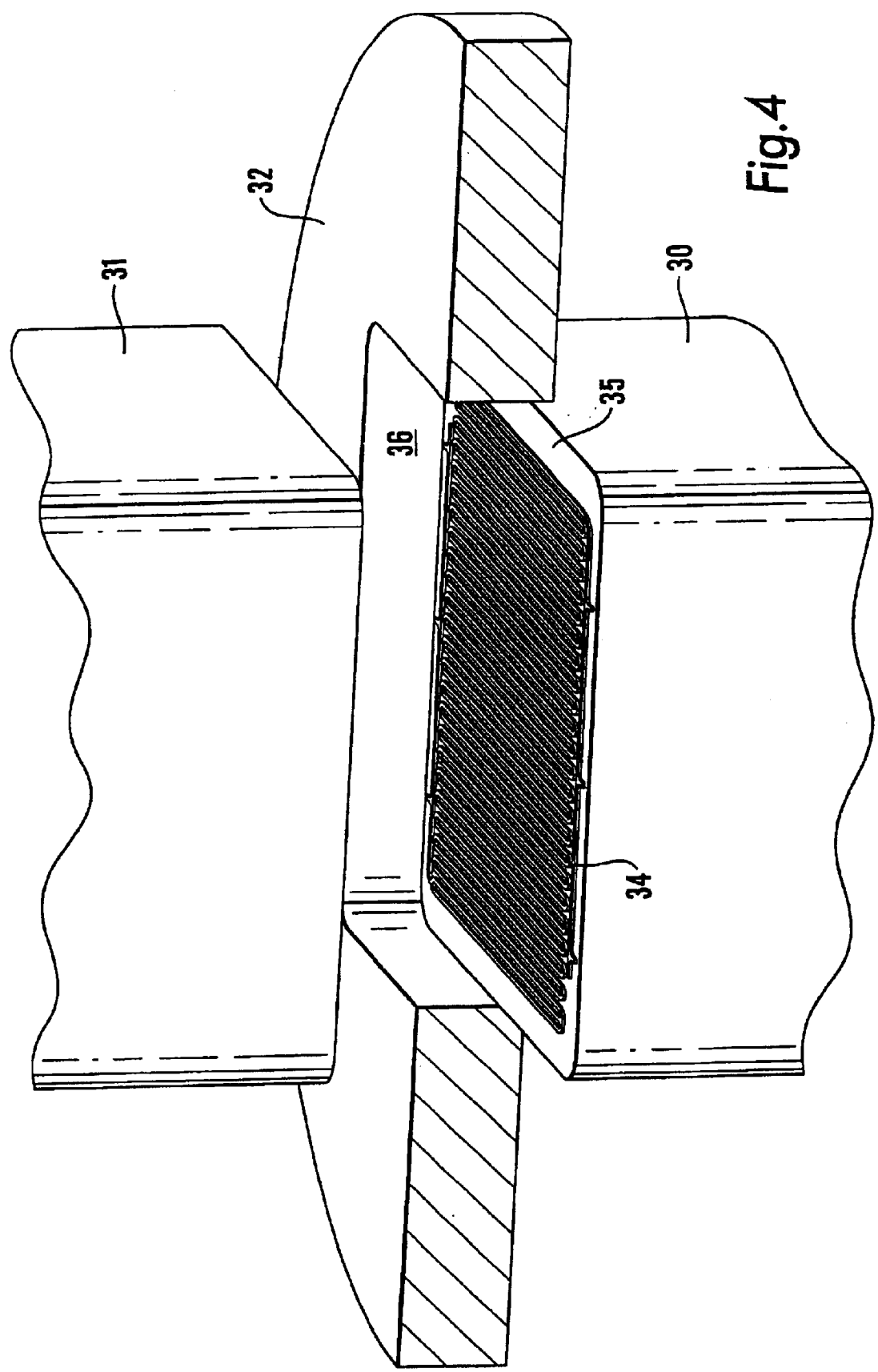
FIG. 4 shows a portion of FIG. 3 at a larger scale.

The tool parts shown in FIG. 1 and FIG. 2 can be used for the manufacturing of the intermediate product 1. The three moulding tool parts consist of a counter punch 20, a punch 21, and a die 22. The latter is shown in cross section. The die sealingly surrounds the upper part of the counter punch 20 and also works as a guide for the punch 21 during the operation of the punch. The surfaces of the counter punch 21 and of the punch 20 which face one another may have equal gravures 23 designed so that the two broad sides of the intermediate product 1 are congruent reproductions of the gravures 23. This in other words means that the counter punch 20 and the punch 21 have a flat central portion 24 for forming the central portion 11 of the intermediate product 1 and a circumferential recess 25 for forming the frame 12 of the intermediate product 1.

When the intermediate product 1 shall be manufactured, an accurately measured quantity of metal and/or ceramic powder is charged into the space 26 defined by the die 22 and the counter punch 20, in which space the counter punch 20 forms a bottom and the die 22 forms a wall. As an alernative, a flat plate can be used as a starting material for the manufacturing of the intermediate product 1. Also such a plate shall contain the same quantity of material as in the desired intermediate product 1 and preferably has an outer shape corresponding to the shape of the die 22. Whether powder or a solid body is used as a starting material, it can be suitable to preheat it before the forming operation, as has been mentioned in the initial disclosure of the invention.

The counter punch 20 and the die 22 are provided in a not shown tool housing, which is placed on a stationary or movable anvil. The punch 21 is brought down into the hole in the die 22 so far that it will contact the powder or the homogeneous plate, respectively. When it is regarding a powder, the punch 21 is pressed with some power against the powder, so that the powder grains are subjected to a slight pressure, such that they will orient themselves for the achievement of a certain close-packing of the powder bed in the mould cavity which is defined by the two gravures 23 and the die 22. Then a ram, i.e. an impact piston in an impact machine, is stricken with very high kinetic energy against the upper side of the punch 21, suitably via an impact body resting against the punch and transfers the impact energy of the ram to the punch. The very high impact energy is transferred to the powder in the mould cavity, so that the powder grains plasticise and the plasticised powder in a few microseconds form a consolidated body having the desired shape of the intermediate product 1. During this high kinetic energy moulding, a certain flow of the material that is plasticised during the impact may occur between the portions 11 and 12.

The punch 21 then is lifted up again and the formed intermediate product 1 is pushed out of the die 22, suitably through a relative movement between the die 22 and the counter punch 20.

In the case when the counter striking principle is applied, as according to the disclosure of any of the Swedish patent applications 0001558-6 or 0002030-5, wherein the counter punch 20 is stricken upwards in the die synchronously with the punch 21 being stricken downwards, and with the same momentum of the movable parts, the forming work is rendered more effectively therein that the kinetic energies to a higher degree are transferred to the product to be formed than in the case when the counter punch 20 is stationary. In this case the velocities need not be as high as when only the punch is subjected to impact action. When employing the counter striking principles, the movable parts thus are accelerated to obtain an adequate kinetic energy, which need not necessarily be extremely high.

In order to ensure that the intermediate product 1 is completely consolidated, it should be sintered prior to the final forming of finished product 2. This is particularly important if the intermediate product is not formed through the supply of a very high kinetic energy, which creates a pressure pulse with a high magnitude of a short duration, but through a more conventional compression moulding, which provides a green body with smaller strength.

The moulding tool parts for forming the finished plate 2 are designed in a way that is analogous with the tool parts for the manufacturing of the intermediate product 1 and comprise a counter punch 30, a punch 31 and die 32, wherein the counter punch 30 and the punch 31 have engravings 33 which are congruent with the broad sides of the finished product 1. Thus the engraving 33 of the counter punch 30, for example, has a central portion 34 with projections which shall form the grooves 9 of the high relief pattern of the central field 3 of the finished metal plate 3, which grooves shall form one or more passages in the plate, and recesses, which shall form the tongues 8 between said recesses/channels 9. Around this profiled central portion 34 there is a circumferential portion 35, which is flat and level with the bottom of the recesses of the central portion 34, so that the two flat sides 5, 6 of the circumferential edge portion 4 will be at level with the top of the tongues 8 of the finished plate 2.

The intermediate product 1 is placed on the counter punch 30 in the space 36 in the die 32. The punch 31 is lowered to rest on the intermediate product 1. Possibly the intermediate product 1 is preheated before an impact member with a very high kinetic energy is stricken against the upper side of the punch 31. The impact energy is transferred to the intermediate product 1 which is plasticised. The material in the central portion 11 flow out to form said tongues 8 and grooves 9, i.e. the high relief embossing of the region of the centre field 3. At the same time the edge portions 4 are also formed to their final shape and when that is needed, pores in the material are eliminated, so that the finished plate 3 will be very dense. Any essential transport of material between the central portion 11 and the edge portions 12 does not take place during this final forming operation. Any possible excess of metal in the edge portions 12, FIG. 5, may be allowed to flow out beyond the end sides 7 that are formed by the die 32, which may be designed with not shown expansion spaces for such minimal metal flow. The "burr" which thus can be formed to a very little extent can be removed in a final skegging operation, when the formed plate 2 has been pushed out from the tool. Also in connection with this final moulding operation the above mentioned counter striking principle can be applied, i.e. that the punch 31 and the counter punch 30 simultaneously are stricken against one another with equal momentums, wherein the velocities of the moving tool parts need not be as high as when the punch 31 is stricken against a stationary counter die, however need be adequate for the achievement of the desired plasticising of the intermediate product, so that the material in the central portion 11 will flow out to form said tongues 8 and grooves 9, i.e. the high relief pattern in the region of the central field 3.

What is claimed is:

1. Method for the manufacturing of a plate (2) of metal or of a ceramic material, the plate comprising one or more fields (3) which occupy the major part of the surface of the plate and which on at least one side of the plate is high relief patterned such that the plate on said at least one side within the area of said field or fields has/have reliefs with high projections and deep valleys (9) or recesses (8) alternatingly, and between the sides a thin web (10), said high relief patterned field or fields being at least partly bordered by broad edge portions (4) which have a thickness larger than the mean thickness of the plate within the region of said high relief patterned field or fields, the method comprising:

manufacturing, in at least one preliminary step, an intermediate product (1), the intermediate product comprising a first portion (11) which shall form said high relief patterned field(s), which however is(are) not yet high relief patterned but contain(s) a quantity of material essentially corresponding to the quantity of material existing within said field(s) of the finished plate, and second portions (12) which shall form said edge portions and which contain substantially the quantity of material that shall exist in those portions of the finished plate, placing the intermediate product between at least two engraved moulding tool parts (30, 31), which are movable relative to one another, at least one of said moulding tool parts being high relief engraved and at least one being a punch (31), said tool parts, when they are maximally brought together, forming between them and/or together with at least one or more tool parts, a mould cavity corresponding to the final shape of the finished plate within the regions of said high relief patterned field(s) and at least near the final shape of said edge portions, and establishing the high relief pattern within the region/regions of said field(s) by striking the engraved tool parts against one another, at least said punch being stricken against said intermediate product wherein the material within the regions of said at least one first portion is caused to flow and fill the mould cavity to establish said high relief pattern essentially without transportation of material between said first and second portions, wherein in connection with the manufacturing of the high relief pattern, an impact member is stricken against at least said at least one punch, which transfers impact energy to the intermediate product (1).

2. Method according claim 1, characterised in that the manufacturing of the intermediate product involves powder technological manufacturing of a green body, which is sintered through heating so that the powder grains coalesce to form an essentially consolidated body.

3. Method according to claim 2, characterised in that the powder grains of starting material are mechanically connected with one another in connection with the manufacturing of the green body.

4. Method according to claim 1, characterised in that the manufacturing of the intermediate product is carried out through pressing powder in a tool, which comprises at least one punch that is subjected to impact action, so that kinetic energy to such a degree is transferred via the punch to the powder that the powder is caused to plasticise.

5. Method according to claim 1, characterised in that the manufacturing of the intermediate product is carried out by pressing powder in a tool, which comprises at least one punch which with such a high pressure is pressed against the powder that the powder is plasticised.

6. Method according to claim 1, characterised in that the manufacturing of the intermediate product is carried out by pressing powder in a tool, which comprises at least one punch that is stricken against the powder with such a high pressure that the powder grains plasticise to form an essentially consolidated body.

7. Method according to claim 2, characterised in that the forming of the intermediate product in the form of a green body or consolidated body is carried out in a plurality of steps.

8. Method according to claim 2, characterised in that the powder is preheated to at least 70° C. prior to forming the intermediate product in one or more operations.

9. Method according to claim 1, characterised in that in connection with the manufacturing of the intermediate product, a first engraved tool part, which is a lower tool part, is stationary and forms a counter punch, and that a second engraved tool part, which is a punch, is stricken or pressed against the counter punch, which contains powder which shall form the intermediate product.

10. Method according to claim 1, characterised in that in connection with the intermediate product, the two tool parts, which are movable relative to one another, are stricken or pressed against one another, one of them from above and downwards and the other one from below and upwards relative to the surroundings.

11. Method according to claim 1, characterised in that the manufacturing of the intermediate product is carried out in a moulding tool, which is charged with so much material that its net volume corresponds to at least the volume of the space of a mould cavity for the final forming of the plate, that the intermediate product then is manufactured through one or more impact operations, wherein any possible surplus material within any of said first and second portions is pressed over to that portion or those portions where there is/are a deficit of material for the achievement of said intermediate product, in which at least said first portion contains a quantity of material which essentially corresponds to the quantity of said high relief patterned field of the finally shaped plate.

12. Method according to claim 1, characterised in that the intermediate product is manufactured through plastic working of a flat plate, which contains at least the quantity of material that shall be included in the finished plate, and that, in connection with the plastic working, material is caused to flow out from said at least a first portion, which shall form said high relief patterned field, to said second portions which shall form said edge portions, so that the remaining quantity of material within the region of said at least a first portion essentially corresponds to the quantity within said high relief patterned field of the finished plate, and so that the resulting quantity in the region of said second portions will contain at least that quantity which shall be included in those portions of the finished product.

13. Method according to claim 1, characterised in that the intermediate product is manufactured by machining a plate within at least the first portion that shall form said high relief patterned field, so that said portion will contain essentially the quantity of material which corresponds to the quantity within said field/fields of the finished plate.

14. Method according to claim 1, characterised in that said edge portions are formed in the space of the mould cavity of the material within said second portions, at the same time as said high relief pattern is being formed.

15. Method according to claim 14, characterised in that surplus material in said second portions of the intermediate product is pressed out from the mould cavity in a partition plane between the tool parts or to particular expansion spaces as the high relief pattern and said edge portions are being formed, and that the material that has been pressed out is then removed by skegging the obtained plate.

16. Method according to claim 1, characterised in that, in connection with the forming of the high relief pattern, a lower engraved tool part, which contains the intermediate product and forms a counter punch, is placed on an anvil and that an upper tool part, which is an embossing punch is stricken against the counter punch.

17. Method according to claim 16, characterised in that the unit which consists of the anvil and a tool unit which contains the counter punch is movable and is caused to move upwards at the same time as the punch is stricken downwards, wherein the masses and velocities of the units which are movable from upwards and from below are such that their momentums, defined by the products of mass multiplied by the velocity, are essentially equal when the movable units meet.

18. Method according to claim 1, characterised in that the finally shaped plate is heated to sintering temperature in a subsequent operation for elimination of any possible remaining pores in the material.

19. Method according to claim 1, characterised in that said material comprises at least one material selected from graphite or other ceramic material, stainless steel, titanium, aluminum, magnesium, or other light metal.

* * * * *